United States Patent Office 3,510,476
Patented May 5, 1970

3,510,476
DIBENZAZEPINE-5-HYDROXAMIC ACID AND DERIVATIVES THEREOF
Martin A. Davis, Montreal, Quebec, Canada, assignor to American Home Products Corporation, New York, N.Y., a corporation of Delaware
No Drawing. Filed Feb. 8, 1967, Ser. No. 614,547
Int. Cl. C07d 41/08
U.S. Cl. 260—239      4 Claims

ABSTRACT OF THE DISCLOSURE

There are disclosed herein the compounds 10,11-dihydro-5H-dibenz[b,f]azepine-5-hydroxamic acid and its corresponding O-methyl, O-ethyl, O-proply, and O-butyl ethers, as well as the corresponding acetyl, propionyl, butyryl, benzoyl, phenylacetyl, and trimethoxybenzoyl esters thereof. The above compounds are anticonvulsant, analgetic, trichomonicidal, and antibacterial agents, and methods for their preparation and use are also given.

---

This invention relates to novel chemical compounds having useful biological properties. More particularly, this invention relates to 10,11-dihydro-5H-dibenz[b,f]azepine-5-hydroxamic acid and to its oxygen-substituted derivatives of the general formula:

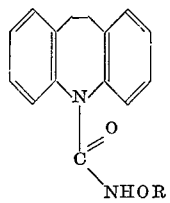

where R represents hydrogen or a lower alkyl group of from 1 to 4 carbon atoms such as, for example, the methyl, ethyl, propyl, or butyl group. R may also represent a lower aliphatic acyl group containing from 2 to 4 carbon atoms, such as, for example, the acetyl, propionyl, or butyryl group, or an aroyl group containing from 7 to 10 carbon atoms, such as, for example, the benzoyl, phenylacetyl or trimethoxybenzoyl group.

A suitable process for preparing the novel compounds of formula I is as follows: A solution of 10,11-dihydro-5H-dibenz[b,f]azepine-5-carbonyl chloride in a suitably inert solvent, such as, for example, benzene, is added to a solution of hydroxylamine or an O-alkyl substituted hydroxylamine of the formula $H_2NOR$ where R is as defined above, dissolved in an appropriate solvent such as, for example, ethanol. After heating the reaction for an appropriate period, on the order of from 1 to 3 hours, the reaction mixture is processed in the conventional manner and the desired hydroxamic acid or its oxygen substituted derivative is isolated and purified by recrystallization from a suitable solvent. The compounds of the general formula in which R represents hydrogen may furthermore be acylated by conventional acylation procedures, and in this manner the correspondingly acylated derivatives of the compounds of the general formula in which R represents a lower aliphatic acyl group containing from 2 to 4 carbon atoms, or an aroyl group containing from 7 to 10 carbon atoms, are obtained.

The required 10,11-dihydro-5H-dibenzo[b,f]azepine 5-carbonyl chloride is readily secured from iminodibenzyl and phosgene as disclosed by C. J. Morel and F. Hafliger in U.S. Pat. No. 2,762,796 (1956).

The novel compounds of this invention have useful biological properties and have value as medicaments. In mammals, at doses considerably below those causing toxic manifestations, they effectively inhibit the convulsive seizures caused by experimental electroshock and are anticonvulsant agents. For such use, they may be formulated in the form of dry powder capsules, compressed tablets, or as suspensions in aqueous vehicles containing from 75 to 400 mg. of the active ingredient per unit dosage form. Such forms may be administered from twice to four times daily. The novel compounds also exhibit analgesic activity and are analgesic agents. The novel compounds further have value as trichomonacidal agents, having activity against the organism Trichomonas foetus. For this purpose, they may be formulated with suitable excipients as vaginal suppositories or vaginal inserts each containing from 50 mg. to 500 mg. and may be administered twice to four times daily for periods of from 1 to 4 weeks. Furthermore, the compounds of this invention have activity against a number of gram-positive and gram-negative microorganisms and are antibacterial agents. They are particularly effective against a number of gram-positive and gram negative microorganisms such as, for example, Staphylococcus pyogenes (both penicillin-sensitive and penicillin-resistant strains). Sarcina lutea, Streptococcus faecalis, Escherichia coli, Aerobacter aerogenes, Salmonella pullorum, Pseudomonas aeruginosa, Proteus mirabilis, and Proteus vulgaris. As anti-bacterial agents, the compounds of this invention may be formulated with suitable excipients in the form of lotions, creams or ointments containing from 0.1 to 1 percent of the active ingredient and may be applied topically as required.

The following formulae and descriptive examples will illustrate this invention (R is as defined above).

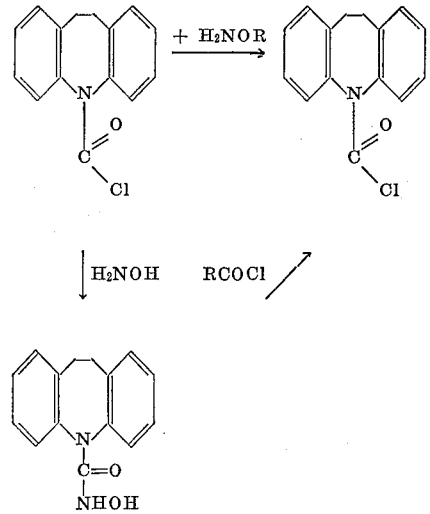

EXAMPLE 1

10,11-dihydro-5H-dibenz[b,f]azepine-5-hydroxamic acid

A solution of 10,11-dihydro-5H-dibenz[b,f]azepine-5-carbonyl chloride (23.5 g.) in anhydrous benzene (100 ml.) is added with constant agitation to a solution of hydroxylamine (prepared from 34.8 g. of hydroxylamine hydrochloride) in ethanol (100 ml.). The mixture is then heated under reflux for 2.5 hours and evaporated in vacuo. The residue is stirred with water and the residual insoluble material is filtered off and dried, furnishing 19.0 g. of the crude title product. Recrystallization from an ethyl acetate-ethanol mixture furnishes a pure sample of M.P. 181–182° C. Elemental analysis confirms the empirical formula $C_{15}H_{14}N_2O_2$. The material gives a positive hydroxamic acid test with 5% aqueous ferric chloride solution.

EXAMPLE 2

10,11-dihydro-5H-dibenz[b,f]azepine-5-(O-methyl) hydroxamic acid

Following the procedure set forth in Example 1, the interaction of 10,11-dihydro-5H-dibenz[b,f]azepine-5-carbonyl chloride (8.0 g.) and methoxyamine (prepared from 13.0 g. of methoxyamine hydrochloride) yields 7.9 g. of the title product. Recrystallization from an ethyl acetate-hexane mixture affords a purified sample of M.P. 161–162° C. In the same manner, but using a hydrohalide salt of ethoxyamine, propoxyamine or butoxyamine, the corresponding 5-O-ethyl, 5-O-propyl, and 5-O-butyl ethers of 10,11-dihydro-5H-dibenz[b,f]azepine - 5 - hydroxamic acid are also obtained.

EXAMPLE 3

10,11-dihydro-5H-dibenz[b,f]azepine-5-O-acetyl-hydroxamic acid 10,11 - dihydro - 5H-dibenz[b,f]azepine-5-hydroxamic acid, obtained as described in Example 1, is dissolved in pyridine and treated with an approximately equimolar amount of acetyl chloride for two hours at 25 to 60° C. Cooling the reaction mixture, dilution with ice-water, filtration of the precipitate, and recrystallization yields the title compound.

In the same manner, but using propionyl or butyryl chlorides, or benzoyl, phenylacetyl or trimethoxybenzoyl chlorides instead of acetyl chloride, the corresponding propionyl, butyryl, benzoyl, phenylacetyl and trimethoxybenzoyl esters of 10,11-dihydro-5H-dibenz[b,f]azepine-5-hydroxamic acid are also obtained.

I claim:
1. A compound of the formula

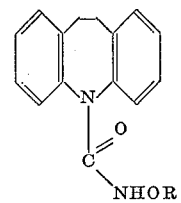

wherein R is selected from the group which consists of hydrogen, lower alkyl, acetyl, propionyl, butyryl, benzoyl, phenylacetyl and trimethoxybenzoyl.

2. 10,11 - dihydro - 5H-dibenz[b,f]azepine-5-hydroxamic acid, as claimed in claim 1.

3. 10,11-dihydro-5H-dibenz[b,f]azepine-5 - (O - methyl) hydroxamic acid, as claimed in claim 1.

4. 10,11-dihydro-5H-dibenz[b,f]azepine-5 - O - acetyl-hydroxamic acid, as claimed in claim 1.

References Cited

UNITED STATES PATENTS 3,221,011  11/1965  Renz et al. _____ 260—239

OTHER REFERENCES

Smith, "Open Chain Nitrogen Compounds," vol. 2 (New York, 1966), pp. 94–95.

ALTON D. ROLLINS, Primary Examiner

U.S. Cl. X.R.

424—244